US008725823B2

(12) United States Patent  
Mansfield et al.

(10) Patent No.: US 8,725,823 B2
(45) Date of Patent: May 13, 2014

(54) LOCATION-BASED COMMUNICATIONS

(71) Applicants: Richard J. W. Mansfield, Cambridge, MA (US); Nissim Shani, Waban, MA (US); Daniel Shani, Waban, MA (US); Roni Shani, Waban, MA (US)

(72) Inventors: Richard J. W. Mansfield, Cambridge, MA (US); Nissim Shani, Waban, MA (US); Daniel Shani, Waban, MA (US); Roni Shani, Waban, MA (US)

(73) Assignee: Forget You Not, LLC, Waban, MA (US)

( * ) Notice: Subject to any disclaimer, the term of this patent is extended or adjusted under 35 U.S.C. 154(b) by 0 days.

(21) Appl. No.: 13/715,517

(22) Filed: Dec. 14, 2012

(65) Prior Publication Data

US 2013/0325979 A1 Dec. 5, 2013

Related U.S. Application Data

(63) Continuation-in-part of application No. 13/650,941, filed on Oct. 12, 2012, which is a continuation-in-part of application No. 13/489,210, filed on Jun. 5, 2012.

(51) Int. Cl.
*G06F 15/16* (2006.01)
(52) U.S. Cl.
USPC .......................................... 709/206
(58) Field of Classification Search
CPC .......................................... H04W 4/02–4/046
USPC .................. 709/204–207; 455/456.1–456.3
See application file for complete search history.

(56) References Cited

U.S. PATENT DOCUMENTS

| 5,634,667 | A | 6/1997 | Jordan |
| 6,324,736 | B1 | 12/2001 | Atrio |
| 7,480,513 | B2 * | 1/2009 | Woo .......................... 455/456.6 |
| 7,499,897 | B2 | 3/2009 | Pinto et al. |
| 7,562,058 | B2 | 7/2009 | Pinto et al. |
| 7,603,292 | B1 | 10/2009 | Bragg et al. |
| 7,680,882 | B2 | 3/2010 | Tiu, Jr. et al. |
| 7,725,300 | B2 | 5/2010 | Pinto et al. |
| 7,730,003 | B2 | 6/2010 | Pinto et al. |
| 7,809,805 | B2 | 10/2010 | Stremel et al. |
| 7,933,762 | B2 | 4/2011 | Pinto et al. |
| 7,933,810 | B2 | 4/2011 | Morgenstern |
| 7,953,654 | B2 | 5/2011 | Abifaker |
| 7,970,657 | B2 | 6/2011 | Morgenstern |
| 8,046,882 | B2 | 11/2011 | Rojdev |

(Continued)

FOREIGN PATENT DOCUMENTS

| JP | 2006-107369 | 4/2006 |
| JP | 2008-234341 | 10/2008 |

(Continued)

OTHER PUBLICATIONS

GiftsOnTime, "Gift Management Simplified", retrieved from Internet on May 14, 2012, www.giftsontime.com, 2012 (1 page).

(Continued)

*Primary Examiner* — Brendan Higa
(74) *Attorney, Agent, or Firm* — Fish & Richardson P.C.

(57) ABSTRACT

A computer-implemented method includes generating a communication to be sent from a sender to a recipient who are related to one another by blood or employment; and scheduling delivery of the communication to the recipient based on a future location of the recipient. The content of the communication and the future location of the recipient are determined from an analysis of electronically-accessible resources by or about the sender, the recipient, or both.

39 Claims, 12 Drawing Sheets

(56) References Cited

U.S. PATENT DOCUMENTS

| | | | |
|---|---|---|---|
| 8,108,501 B2 | 1/2012 | Birnie et al. | |
| 8,135,624 B1 | 3/2012 | Ramalingam et al. | |
| 8,140,403 B2 | 3/2012 | Ramalingam et al. | |
| 8,165,853 B2 | 4/2012 | Pinto et al. | |
| 8,190,519 B1 | 5/2012 | Angilivelil et al. | |
| 2002/0072925 A1 | 6/2002 | Krim | |
| 2003/0009461 A1 | 1/2003 | Notargiacomo et al. | |
| 2004/0078283 A1 | 4/2004 | Gary | |
| 2005/0154706 A1 | 7/2005 | Notargiacomo et al. | |
| 2005/0234762 A1 | 10/2005 | Pinto et al. | |
| 2005/0262212 A1* | 11/2005 | Arslan et al. | 709/206 |
| 2006/0242037 A1* | 10/2006 | Tanimura et al. | 705/35 |
| 2007/0049289 A1* | 3/2007 | Woo | 455/456.1 |
| 2008/0005666 A1 | 1/2008 | Sefton et al. | |
| 2008/0089489 A1* | 4/2008 | Katkam et al. | 379/88.13 |
| 2008/0102856 A1 | 5/2008 | Fortescue et al. | |
| 2008/0147430 A1 | 6/2008 | Hawthorne | |
| 2008/0189188 A1 | 8/2008 | Morgenstern | |
| 2008/0201924 A2 | 8/2008 | Sinclair | |
| 2008/0255988 A1 | 10/2008 | Maltese | |
| 2009/0055482 A1* | 2/2009 | Zhang et al. | 709/206 |
| 2009/0125410 A1 | 5/2009 | Perlman | |
| 2009/0197681 A1 | 8/2009 | Krishnamoorthy et al. | |
| 2009/0233618 A1* | 9/2009 | Bai et al. | 455/453 |
| 2009/0265382 A1 | 10/2009 | Freiman et al. | |
| 2009/0271486 A1* | 10/2009 | Ligh et al. | 709/206 |
| 2009/0276284 A1 | 11/2009 | Yost | |
| 2009/0311992 A1* | 12/2009 | Jagetiya | 455/412.1 |
| 2009/0327129 A1 | 12/2009 | Collas et al. | |
| 2010/0169160 A1 | 7/2010 | Wu et al. | |
| 2010/0223341 A1* | 9/2010 | Manolescu et al. | 709/206 |
| 2010/0262449 A1 | 10/2010 | Monteforte et al. | |
| 2010/0323715 A1* | 12/2010 | Winters | 455/456.1 |
| 2011/0022602 A1 | 1/2011 | Luo et al. | |
| 2011/0035260 A1* | 2/2011 | Nielsen et al. | 705/11 |
| 2011/0047229 A1 | 2/2011 | Sinha et al. | |
| 2011/0071956 A1 | 3/2011 | Pinto et al. | |
| 2011/0078173 A1 | 3/2011 | Seligmann et al. | |
| 2011/0081007 A1* | 4/2011 | Bar-Yoav | 379/88.13 |
| 2011/0099048 A1 | 4/2011 | Weiss et al. | |
| 2011/0168828 A1 | 7/2011 | Mori | |
| 2011/0238474 A1 | 9/2011 | Carr et al. | |
| 2011/0238755 A1 | 9/2011 | Khan et al. | |
| 2011/0313946 A1 | 12/2011 | Browne et al. | |
| 2012/0016678 A1 | 1/2012 | Gruber et al. | |
| 2012/0294613 A1* | 11/2012 | Hood et al. | 398/67 |
| 2012/0315876 A1* | 12/2012 | Srinivasan | 455/411 |
| 2013/0041740 A1 | 2/2013 | Tyler et al. | |
| 2013/0166607 A1* | 6/2013 | Turk et al. | 707/803 |
| 2013/0325976 A1 | 12/2013 | Mansfield et al. | |
| 2013/0325978 A1 | 12/2013 | Mansfield et al. | |

FOREIGN PATENT DOCUMENTS

| | | |
|---|---|---|
| JP | 2011-101337 | 5/2011 |
| JP | 2003-256560 | 9/2013 |
| WO | WO 2013/184793 | 12/2013 |

OTHER PUBLICATIONS

Owen, Sara, et al., "How Mobile Vouchers are Transforming Mobile Marketing", First Data Corporation, 2011 (9 pages).

Lane, Nick, "Mobile geo-location advertising will be a big number in 2015", Mobile Squared, retrieved from the Internet, Feb. 24, 2012 (15 pages).

Todd, Greg, "Using Predictive Analytics to Determine the Best Offer", Information Management, Sep. 22, 2008 (13 pages).

Gillies, Donald, "Causality, Propensity, and Bayesian Networks", 2002 (18 pages).

Darren, "New HR Celebration Toolkit—Birthdays, Long Service Awards, Weddings and more . . . ", Voucher Shop, Jul. 23, 2012 (3 pages).

"McDonald's Debuts New Geolocation Mobile Ad Campaign", Marketing Vox, Jan. 31, 2012 (2 pages).

U.S. Appl. No. 13/489,210, filed Jun. 5, 2012 with pending claims.

U.S. Appl. No. 13/650,941, filed Oct. 12, 2012 with pending claims.

Transaction history of U.S. Appl. No. 13/489,210.

"Donor organ storage machine keeps kidneys fresher, boosts transplant success," Daily Mail Reporter, Jan. 1, 2009, 1 page.

The interest of the unborn child (nasciturus), from http://wikistudent.ws/Unisa, 2006, 41 pages.

International Search Report and Written Opinion from PCT application No. PCT/US2013/044301 mailed Aug. 21, 2013 (17 pages).

Transaction history of U.S. Appl. No. 13/650,941.

Transaction history of U.S. Appl. No. 13/715,517.

* cited by examiner

300

Registration

302 {
- Name _____
- Phone number _____
- Email address _____
- Social networking ID _____

304 {
- Device name _____  ○ Preferred?
  306
- Device identifier _____
- Device name _____  ○
  306
- Device identifier _____

308 | Communication preferences

Communications Adminstration

402　Recipient

404　Recipient criteria

406　Triggering locations

408　Location criteria

410　Triggering times

412　Time criteria

| Edit communication | 414 | 420 | Scheduled communications |

| Upload communication | 416 |

| Approve communication | 418 |

FIG. 4

LOCATION-BASED COMMUNICATIONS

CROSS-REFERENCE TO RELATED APPLICATIONS

This application is a continuation-in-part application of and claims priority to U.S. patent application Ser. No. 13/489,210, filed Jun. 5, 2012, and to U.S. patent application Ser. No. 13/650,941, filed Oct. 12, 2012, the entire contents of both which are incorporated here by reference.

BACKGROUND

This description relates to location-based communications from a sender to a recipient.

A typical user of a social networking website communicates with other users of the social networking website by posting information about himself or information of interest to other users of the social network website in a manner that is accessible to the other users. For example, a user of a social networking website might post background information about himself, such as current job or activity information: information about events attended, such as concerts; events the user plans to attend, such as travel vacation sites; or personal events, such as birthdays or anniversaries. A user may also post information about recent acquisitions, such as the purchase of a new automobile or smartphone. Other users who have access to the user's posted information may contact the user to comment or review information about common shared interests or for other reasons.

Some social networking websites filter or group connections based on, e.g., friendship, profession or job type, or geographical location. Social networks often span users within a single generation (e.g., Generation X or Generation Y) or at least within a limited age demographic.

SUMMARY

In a general aspect, a computer-implemented method includes generating a communication to be sent from a sender to a recipient who are related to one another by blood or employment; and scheduling delivery of the communication to the recipient based on a future location of the recipient. The content of the communication and the future location of the recipient are determined from an analysis of electronically-accessible resources by or about the sender, the recipient, or both.

Embodiments may include one or more of the following.

The method includes sending the communication to the recipient when the recipient is at or near the future location.

The method includes sending the communication to a mobile computing device associated with the recipient.

The method includes detecting a location of the recipient. In some cases, detecting a location of the recipient includes detecting GPS coordinates of a computing device associated with the recipient. In some cases, the method includes sending the communication to the recipient when the location of the recipient matches the future location.

Scheduling delivery includes scheduling delivery of the communication to the recipient at a specified future time. In some cases, the method includes sending the communication to the recipient when the recipient is at or near the future location at the specified future time. In some cases, the method includes receiving time criteria for determining the specified future time; and determining the future time based on the time criteria.

The method includes receiving location criteria for determining the future location; and wherein the future location is determined based on the location criteria. In some cases, the location criteria include at least one of a characteristic of the future location, a characteristic of the sender, and a characteristic of the recipient.

Generating the communication includes generating a draft communication including at least some of the determined content; providing the draft communication to the sender; and receiving the communication from the sender.

Generating the communication includes generating the communication including at least some of the determined content.

The method includes conducting an automated analysis of the electronically-accessible resources to determine the content of the communication and the future location.

The communication includes a multimedia message.

The electronically-accessible resources include at least one of (a) electronically-accessible or mobile social networking facilities, (b) electronically-accessible or mobile periodicals, and (c) websites.

The electronically-accessible resources include a database storing data relevant to the sender, the recipient, or both.

In a general aspect, a computer-implemented method includes generating a communication to be sent from a sender to a recipient; and scheduling delivery of the communication to the recipient at a specified future time based on a future location of the recipient. The identity of the recipient, the content of the communication, the future time, and the future location of the recipient are determined from an analysis of electronically-accessible resources by or about the sender or the recipient.

Embodiments may include one or more of the following.

The method includes sending the communication to the recipient when the recipient is at or near the future location at the specified future time.

The method includes sending the communication to a mobile computing device associated with the recipient.

The method includes detecting a location of the recipient. In some cases, detecting a location of the recipient includes detecting GPS coordinates of a computing device associated with the recipient. In some cases, the method includes the communication to the recipient when the location of the recipient matches the future location.

The method includes receiving location criteria for determining the future location; and wherein the future location is determined based on the location criteria. In some cases, the location criteria include at least one of a characteristic of the future location, a characteristic of the sender, and a characteristic of the recipient.

The method includes receiving recipient criteria for determining the identity of the recipient; and wherein the identity of the recipient is determined based on the recipient criteria. In some cases, the recipient criteria include a relationship between the sender and the recipient, such as a future relationship between the sender and the recipient. In some cases, the recipient criteria include a characteristic of the recipient.

The method includes receiving time criteria for determining the specified future time; and wherein the specified future time is determined based on the time criteria.

Generating the communication includes generating a draft communication including at least some of the determined content; providing the draft communication to the sender; and receiving the communication from the sender.

Generating the communication includes generating the communication including at least some of the determined content.

The method includes conducting an automated analysis of the electronically-accessible resources to determine the content of the communication and the future location.

The communication includes a multimedia message.

The electronically-accessible resources include at least one of (a) electronically-accessible or mobile social networking facilities, (b) electronically-accessible or mobile periodicals, and (c) websites.

The electronically-accessible resources include a database storing data relevant to the sender, the recipient, or both.

In a general aspect, a computer-implemented method includes generating a communication to be sent from an employer to an employee; and scheduling delivery of the communication to the employee based on a future location of the employee. The content of the communication and the future location of the employee are determined from an analysis of electronically-accessible resources by or about the employee.

Embodiments may include one or more of the following.

The method includes sending the communication to the employee when the employee is at or near the future location.

The method includes sending the communication to a mobile computing device associated with the employee.

The method includes detecting a location of the employee. In some cases, the method includes sending the communication to the employee when the location of the employee matches the future location.

Scheduling delivery includes scheduling delivery of the communication to the employee at a specified future time. In some cases, the method includes sending the communication to the employee when the employee is at or near the future location at the specified future time. In some cases, the method includes receiving time criteria for determining the specified future time; and determining the future time based on the time criteria.

The method includes receiving location criteria for determining the future location; and wherein the future location is determined based on the location criteria. In some cases, the location criteria include at least one of a characteristic of the future location, a characteristic of the employer, and a characteristic of the employee.

Generating the communication includes generating a draft communication including at least some of the determined content; providing the draft communication to the employer or an agent for the employer; and receiving the communication from the employer or the agent for the employer.

Generating the communication includes generating the communication including at least some of the determined content.

The method includes conducting an automated analysis of the electronically-accessible resources to determine the content of the communication and the future location.

The electronically-accessible resources include at least one of (a) electronically-accessible or mobile social networking facilities, (b) electronically-accessible or mobile periodicals, and (c) websites.

The electronically-accessible resources include a database storing data relevant to the employer, the employee, or both.

These and other aspects, features, implementations, and advantages, and combinations of them, can be expressed as methods, apparatus, systems, components, program products, business methods, and means or steps for performing functions, or combinations of them.

Other features, aspects, implementations, and advantages will become apparent from the description, the drawings, and the claims.

DESCRIPTION

FIG. 3 is a view of a recipient user interface.

FIG. 4 is a view of a sender user interface.

The system that we describe here enables a communication to be sent from one party (sometimes called a sender) to one or more other parties (sometimes called recipients) based on a location of the recipient at a future time. In some examples, the communication is to be sent when the recipient is at a previously identified location (which we sometimes call a triggering location). For instance, a welcome message may be sent to travelers when they arrive at an airport. In some examples, the communication is to be sent when the recipient is at a triggering location at a previously identified time (which we sometimes call a triggering time). For instance, a coupon for use at a coffee shop may be sent to one or more potential customers who are within a certain distance of the coffee shop in the morning.

In some examples, the system described here automatically identifies the one or more recipients of the communication, the triggering location, or the triggering time, or a combination of any two or more of them. In some examples, the sender identifies the one or more recipients of the communication, the triggering location, or the triggering time, or a combination of any two or more of them.

The communication to the recipient may be generated by the system, the sender, or both. The system described here conducts an automated analysis of sources of information, such as websites, publications, social networks, or other electronically-accessible sources, or a combination of any two or more of them, to identify content for the communication that is to be sent to the recipient. The system may automatically generate the communication using some or all of the identified content. The system may also provide the identified content to the sender, who may then choose to include some or all of the identified content in the communication. We use the term "electronically-accessible" broadly to include, for example, accessible through a local area network (LAN), a wide area network (WAN), the Internet, a mobile phone network, or by any other method or combination of methods.

Figure 1:
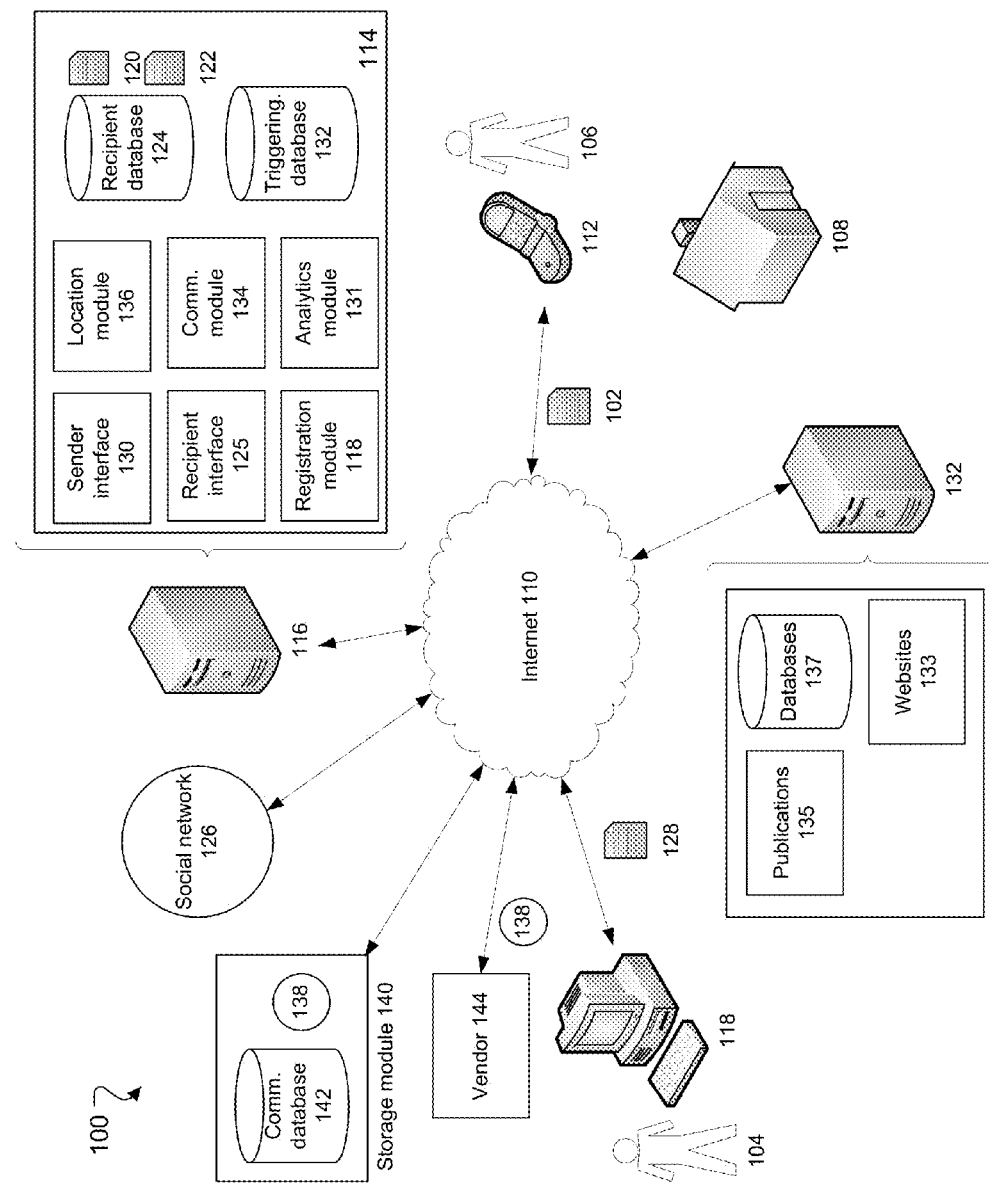
FIG. 1 is a block diagram of an example system for sending a communication.

Referring to FIG. 1, a system 100 enables a communication 102 to be sent from a sender 104 to a recipient 106 when the recipient 106 is at or near a triggering location 108. The communication 102 may be a multimedia message (e.g., a message that includes voice, text, images, or video, or any combination of two or more of them) that is sent over a network 110, such as the Internet, to a computing device 112 associated with the recipient 106. The computing device 112 may be a personal computer, a mobile computing device such as a smartphone or a tablet, or another type of computing device.

A communication system 114, hosted on a server 116, facilitates the sending of the communication 102 to the recipient 106. In some examples, a registration module 118 in the communication system 114 registers a person as a potential recipient. For instance, the registration module 118 may collect personal information 120, such as name, phone number, e-mail address, social networking information, or communication preferences, or a combination of any two or more of these. The registration module 118 may also collect device information 122 about the computing device 112 through which the person's location is to be tracked. The personal information 120 and device information 122 are stored in a recipient database 124. In some examples, a person may register directly with the communication system 114, e.g., through a recipient interface 125. In some examples, a person is registered automatically with the communication system 114, e.g., when he enrolls in a social network 126 or other electronically-accessible service or when he joins a particular group in a social network. In some examples, a person is registered with the communication system 114 by another party. For instance, a human resources officer of a corporation may register all employees of the corporation with the communication system 114.

In some examples, the sender 104 and the recipient 106 are related through a relationship, such as a family relationship, an employment relationship, or another type of relationship, or a combination of any two or more of them. For instance, in an example of a family relationship, the sender 104 may be a grandfather who wants to send a message to his as-yet-unborn grandchild (the recipient 106) at a future time. In an example of an employment relationship, the sender 104 may be the human resources department of a corporation and the recipients 106 are employees of the corporation. In some examples, the sender 104 and the recipient 106 have no particular relationship. For instance, the sender 104 may be an advertiser sending a marketing offer or a coupon to one or more potential customers, who are the recipients 106.

The sender 104 (or an agent for the sender 104) provides instructions 128 for the sending of the communication 108 to the communication system 114 by accessing a sender interface 130 using a computing device 118, such as a personal computer or a mobile computing device or other type of computing device. For instance, the sender 104 may specify the recipient 106, provide one or more recipient criteria to be used by the communication system 114 to identify the recipient 106, specify the triggering location 108, provide one or more location criteria to be used by the communication system 114 to identify the recipient, specify the triggering time, or provide one or more time criteria to be used by the communication system 114 to identify the triggering time, or a combination of any two or more of them.

If the sender provided one or more of recipient criteria, triggering criteria, and triggering criteria, an analytics module 131 uses the provided criteria to identify the recipient 106, the triggering location 108, and the triggering time, respectively. The analytics module may use data stored in the recipient database 124 to identify one or more of the recipient 106, the triggering location 108, or the triggering time. The analytics module 130 may access data sources 132, such as websites 133, electronically-accessible publications 135, social networks 126, electronically-accessible databases 127, or other electronically-accessible sources, or a combination of two or more of them, to identify one or more of the recipient 106, the triggering location 108, or the triggering time.

The identity of the recipient 106 and the associated triggering location 108, the triggering time, or a combination of two or more of them, as specified by the sender 104 or as identified by the analytics module 131, are stored in a triggering database 132.

A communication module 134 facilitates the preparation of the communication 102 that is to be sent to the recipient 106. In some examples, the communication module 134 identifies information that may be about or of interest to the sender 104, the recipient 106, or both, and automatically generates the communication 102 based on that information. For instance, the communication module 134 aided by the analytics module 131 may identify news articles, photographs, multimedia files, coupons or special offers, or other information, or a combination of any two or more of them, that are about or of interest to the sender 104, the recipient 106, or both. The automatically generated communication 102 may be approved by the sender 102. In some examples, the communication module 134 generates a draft or template of a communication to be edited or completed by the sender 104. For instance, a draft communication may include some of the information identified by the communication module 134 and may further include space for the sender to compose a message, insert a photograph, or otherwise supplement or edit the communication. In some examples, the sender 104 prepares the communication 102 with no assistance from the communication module 134.

In some examples, a communication 102 is prepared specifically for a particular recipient 106 (e.g., the grandfather sending a message to his grandchild). In some examples, a communication 102 is prepared for multiple recipients (e.g., a coupon sent to many prospective customers).

The communication is stored in a communication database 142 of a storage module 140. In some examples, the information about or of interest to the sender 104, the recipient 106, or both that is identified by the communication module 134 is also stored in the communication database 142. In the illustrated example, the storage module is separate from the communication system 114; in some examples, the storage module 140 may be co-located in the same physical location with the communication system.

In some examples, a physical item 138, such as a gift or a memento, may be sent to the recipient 106 along with the communication 102. The physical item 138 may be stored in a physical storage, such as a warehouse, associated with the storage module 140, until it is to be sent to the recipient 106. The physical item 138 may also be ordered from a vendor 144 and sent directly to the recipient 106. In some examples, the communication 102 may include a coupon or voucher for services (e.g., a massage or a car wash) to be provided by a vendor 144.

For each recipient 106 stored in the triggering database 132, a location module 136 monitors the location of the computing device 112 associated with the recipient 106 (i.e., as a proxy for the location of the recipient 106). For instance, the location module 136 may monitor the GPS coordinates of the computing device 112, the proximity of the computing device to a WiFi hotspot, or another location-based signal. The location module 136 may monitor the location of the computing device 112 continuously or regular intervals, such as every 5 minutes, every hour, or every day. In some examples, the monitoring interval may be dependent on the nature of the triggering location 108. For instance, if the triggering location is a city or country, the location module 136 may monitor the location of the computing device 112 less frequently than if the triggering location is a street address or a store.

When the location module 136 detects that the recipient 106 is at or near the triggering location 108 (e.g., within a particular distance of the triggering location), the location module 136 alerts the communication module 134, the sender 104, or both. In some examples, the communication module 134 automatically sends the communication 102 to the recipient 106. In some examples, the sender 104 instructs the communication module 134 to send the communication 102 to the recipient 106.

In some examples, the sender 104 and the recipient 106 may be the same person. For example, the sender 104 may request to be reminded of a planned trip, event, or visit in the future. For instance, the sender 104 may instruct the communication module 134 to send a communication 102 to his mobile telephone when he checks into his hotel on his trip to New York the next month. The sender 102 may specify that the communication 102 is to remind him to visit the Frick Museum and should contain images of important paintings at the museum.

Figure 2:
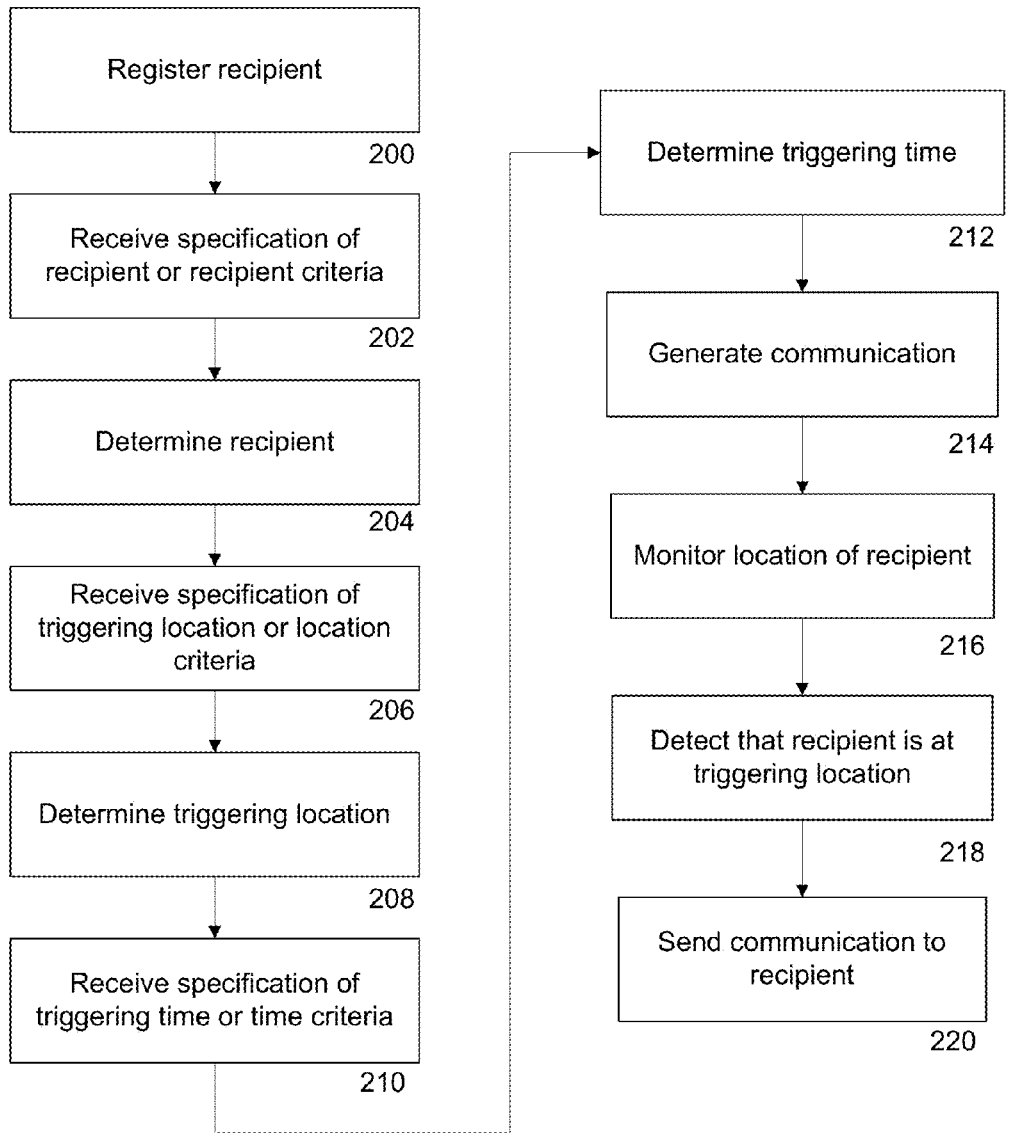
FIG. 2 is a flow chart.

Referring to FIG. 2, in an example process for sending a communication from a sender to a recipient, the recipient is registered with the communication system (200). For instance, the recipient may provide information such as his name, contact information, or information about his computing device. The recipient may also provide information about the types of communications he is interested in receiving. For instance, the recipient may indicate that he only wants to receive communications from his friends in a particular social network or that he does not want to receive communications from commercial entities.

The sender specifies the recipient, provides recipient criteria to be used by the communication system to identify the recipient, or both (202). If the sender provides recipient criteria, the communication system automatically determines the recipient (204). For instance, the recipient criteria may describe a relationship between the sender and the recipient (e.g., "my oldest granddaughter" or "hourly employees of BankOne Corp."). The recipient criteria may describe one or more characteristics of the recipient (e.g., "professional women who live in Boston," "people who are likely to attend the theater," or "dog owners").

The sender specifies the triggering location, provides location criteria to be used by the communication system to identify the triggering location, or both (206). If the sender provides location criteria, the communication system automatically determines the location (208). The triggering location may be an address (e.g., 1911 Main Street, Philadelphia, Pa.) or a place (e.g., John F. Kennedy International Airport). The triggering criteria may describe one or more characteristics of the triggering location (e.g., "my mother's tennis club" or "coffee shops near the recipient's office"). In some examples, the sender specifies a threshold distance around the triggering location within which the recipient can be considered to be "at" the triggering location. In some examples, the communication system determines the threshold distance, e.g., based on the location or by applying a default threshold value.

The sender may also specify the triggering time, provide time criteria to be used by the communication system to identify the triggering time, or both (210). If the sender provides time criteria, the communication system automatically determines the triggering time (212). The triggering time may be, for example, a specific time (e.g., 10:00 am), a period of time (e.g., the morning), a specific day (e.g., Monday), or a specific date (e.g., Jan. 1, 2013), or another time. The triggering time may be a threshold time (e.g., any time after Apr. 12, 2020). The time criteria may describe the triggering time in terms of an event (e.g., "my niece's birthday"), in terms of a propensity for an activity (e.g., "a period of time when the recipient is likely to buy ice cream"), or in another way. In some examples, no triggering time is specified and no time criteria are provided. In these examples, the communication is sent to the recipient whenever the recipient is at or near the triggering location.

A communication is generated (214) by the sender, the communication system, or both. In some examples, the sender generates the communication and provide (e.g., upload) the communication to the communication system. In some examples, the communication is generated at a future time determined by the communication system, specified by the sender, or both. For instance, a communication that is to be sent on the tenth birthday of an as-yet-unborn grandson is generated only once the grandson is born. In some examples, the communication is generated immediately when the sender provides instructions to the communication system.

In some examples, the communication system automatically generates the communication, e.g., based on data collected from electronically-accessible data sources, based on information about the recipient, or both. For instance, the communication system may include images from social networking websites in a communication generated for a recipient's birthday. In some examples, the communication is generated by a combination of the sender and the communication system. For instance, the communication system may collect potentially relevant data from online data sources, format the collected data into a draft communication, and provide the communication to the sender for editing. The communication system may also provide data to the sender, e.g., in a list form, so that the sender can prepare the communication based on the collected data.

The communication system monitors the location of the recipient (216). For instance, the communication system monitors the GPS coordinates of the computing device associated with the recipient. If a triggering time was specified by the sender or identified by the communication system, the communication system monitors the location of the recipient at the triggering time. For instance, if the triggering time is a specific date, the communication system may monitor the location of the recipient on that date only. If the triggering time is a threshold time (e.g., any time after Apr. 12, 2020), the communication system begins monitoring the location of the recipient at or after the threshold time.

When the communication system detects that the recipient is at or near the triggering location (218), the communication is sent to the recipient (220). In some examples, the communication is sent automatically. In some examples, the communication is sent after approval by the sender.

Referring to FIG. 3, in some examples, a person enrolls with the communication system through a recipient interface 300 to register as a recipient available to receive communications through the communication system. The person enters personal information 302, such as name, phone number, e-mail address, social networking information, or other personal information, or a combination of any two or more of these. In some examples, a person may be registered automatically with the communication system. For instance, a person may be registered, e.g., when he enrolls in a social network or other electronically-accessible service or when he joins a particular group in a social network. A person may also registered by another party. For instance, a human resources officer of a corporation may register all employees of the corporation.

Upon registration, the person identifies one or more computing devices whose location is to be monitored by the computing system when a communication is to be sent to the person. In some examples, the person enters device information 304 about the computing device, such as a unique device identifier. In some examples, the device information 304 is populated automatically, e.g., if the person registers using the computing device he intends to associate with the communication or if the person is registered automatically. The person may enter device information 404 about one or more computing devices and may specify a device preference 306, e.g., by marking a particular computing device as a preferred device. The person may also enter communication preferences (menu 308), e.g., to indicate specific people, groups of people, or entities from which he does or does not wish to receive communications. For instance, the person may restrict his communication preferences such that, e.g., he receives communications only from his family members or only from people to whom he is linked on a social network.

Referring to FIG. 4, an example sender interface 400 allows the sender to administer the sending of a communication to a recipient. The sender can specify the recipient 402, e.g., by typing the name of the recipient, by selecting the recipient from a list of contacts (e.g., social network users with whom the sender is linked, family members, or business partners) or a list of suggested recipients (e.g., recipients suggested by the communication system), by speaking the name, or in another manner. The sender can also provide recipient criteria 404, e.g., by typing recipient criteria, by selecting recipient criteria from a list of potential criteria, or in another manner. The sender can specify one or more triggering locations 406 for each recipient, e.g., by typing an address or a particular location, by identifying a location on a map, by selecting the triggering location from a list of potential triggering locations (e.g., recipients suggested by the communication system), by speaking the location, or in another manner. The sender can also provide location criteria 408, e.g., by typing triggering criteria, by selecting triggering criteria from a list of potential criteria (e.g. triggering criteria suggested by the communication system), by speaking the location or in another manner. The sender can also specify one or more triggering times 410 or triggering criteria 412 for each recipient and each triggering location, e.g., by typing a triggering time or event, by selecting the triggering time from a list of potential triggering times or triggering criteria (e.g., triggering times suggested by the communication system), by speaking the time or event or in another manner.

Using the sender interface, 400, the sender can prepare or edit the communication (button 414) using a built-in communication editor, upload a communication that was prepared elsewhere (button 416), and view and approve a communication prepared by the communication system (button 418). The sender can also monitor the status of a previously scheduled communication (e.g., to monitor the delivery of a communication) by selecting the communication from a menu 420.

Figure 5:
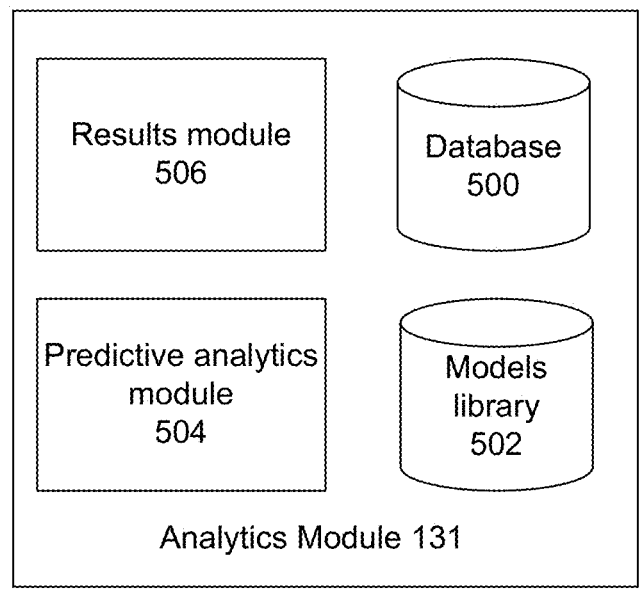
FIG. 5 is a block diagram of an example analytics module.

Referring to FIG. 5, the analytics module 131 provides analytic capabilities that assist the sender in selecting a recipient, a triggering location, a triggering time, contents of the communication, or other details related to the delivery of a communication, or a combination of any two or more of them. In some embodiments, the analytics module 131 may act as a surrogate of a sender to generate responses (e.g., messages, offers and/or delivery instructions) based on historical data specific to the recipient. Recipient data, such as current or historical data retrieved from websites, social networks, publications, other electronically-accessible sources, recipient registration information, or other sources, or a combination of any two or more of them, are stored in a database 500. A models library 502 stores search algorithms and forecasting models that can be used to analyze the recipient data stored in the database 500.

A predictive analytics submodule 504 applies the search algorithms and forecasting models stored in the models library 502 to select potential recipients, triggering locations, triggering times, contents of the communication, or other details related to the delivery of a communication. The predictive analytics submodule 504 may implement one or more forecasting techniques, including simple algorithms, future date calculation, including statistical techniques such as machine learning (e.g., as applied by IBM's Watson computer), game theory, and data mining. In some examples, the predictive analytics incorporate the robust, optimizing forecasting techniques of Pinto et al. (U.S. Pat. No. 7,499,897, issued on Mar. 3, 2009; U.S. Pat. No. 7,562,058, issued on Jul. 14, 2009; U.S. Pat. No. 7,725,300, issued on May 25, 2010; U.S. Pat. No. 7,730,003, issued on Jun. 1, 2010; U.S. Pat. No. 7,933,762, issued on Apr. 26, 2011; and U.S. patent application Ser. No. 10/826,949, filed Apr. 16, 2004, the contents of all of which are incorporated herein by reference), that manage historical data using missing values, which must be inferred.

In some examples, the predictive analytics submodule 504 may be configured as described by Gruber et al. (U.S. patent application Ser. No. 12/987,982, filed Jan. 10, 2011, and U.S. patent application Ser. No. 13/492,809 filed Jun. 9, 2012, the contents of both of which are incorporated herein by reference). For instance, the predictive analytics submodule 504 may include an automated assistant receiving user input. The predictive analytics submodule 504 may also include an active ontology with representations of concepts and relations among concepts drawn from various databases of historical data. For instance, for the example in which the sender is an agent of a corporation, the corporate personnel database may be referenced in the active ontology. The predictive analytics submodule 504 may also include a language interpreter to parse the sender's input in order to derive a representation of the sender's intent in terms of the active ontology. The predictive analytics submodule 504 may also include a services orchestration component to output responses and instructions to implement the sender's intent.

A results module 506 communicates the results of the analysis conducted by the predictive analytics submodule 504 to the communication module 134, the triggering database 132 (FIG. 1), or both. In one example, potential triggering locations and triggering times for a recipient specified by the sender are identified by the predictive analytics submodule 504 and provided to the communications module 134. The communications module 134 presents the potential triggering locations to the sender, who may select one or more of the locations. In one example, if the sender instructed the communication system to automatically identify recipients to whom coupons for a clothing store are to be sent, then the recipients identified by the predictive analytics submodule 504 are stored in the triggering database 132 without review by the sender.

For example, the predictive analytics submodule 504 may select content for a communication to be sent to a recipient specified by the sender at a triggering location specified by the sender. For instance, a grandfather may instruct the communications system to prepare an autobiographical communication to be sent to his grandson when the grandson is in the vicinity of the Metropolitan Museum of Art. The predictive analytics submodule 504 conducts an analysis of data relevant to the grandfather to select content that may be included in the autobiographical communication. The data may be sourced from the grandfather's social networking profile (e.g. photographs or status updates), from publications or news articles about the grandfather, from websites visited by the grandfather, or from any other source having data accessible to the predictive analytics submodule 504. The predictive analytics submodule 504 may also generate data relevant to the grandfather based, e.g., on historical data available about the grandfather. In some examples, the triggering location may also be used to identify content that may be included in the communication. For instance, content that is related to art, culture, or museums may be given special consideration in the selection of content for the grandfather's autobiographical communication. The selected content is provided to the communications module 134, which may assemble the grandfather's communication or may provide the content to the sender for assembly.

In another example, the predictive analytics submodule 504 may identify potential triggering locations, triggering times, or both for a particular recipient. Triggering locations and times may be identified based on the recipient's age, personal characteristics, home address, work address, commute pattern, travel habits, consumption habits, or other characteristics. For instance, a bar mitzvah date may be identified for a child based on the child's birth date. Appropriate religious holidays may be identified for a recipient based on the recipient's religious affiliation (e.g., as specified by the recipient or as inferred by the predictive analytics submodule 504) or based on the prevailing religion in the region where the recipient lives. The predictive analytics submodule 504 may also identify appropriate times for delivery of a communication separately from identifying the triggering time. For instance, based on a recipient's age, profession, computer usage patterns, or other factors, the predictive analytics submodule 504 may estimate when the recipient is expected to wake up in the morning such that a communication is not delivered before the recipient wakes up.

In another example, the predictive analytics submodule 504 may identify potential recipients based on an analysis of electronically-accessible sources of information, data stored in the recipient database, or both. For instance, potential recipients may be identified that meet one or more specified characteristics (e.g., high-income professional women or commuters who ride the 66 bus in the morning). Potential recipients may be identified by their relationship with the sender (e.g., all employees of Acme Corp. who live in the Chicago area or all social network connections of the sender). In some examples, the predictive analytics submodule 504 may have access to marketing databases to analyze characteristics of potential recipients. In some examples, the predictive analytics submodule 504 may have access to a list of past or potential customers of a business and may identify and rank potential recipients based on that list in terms of propensity to purchase based on historical data.

Figure 6:
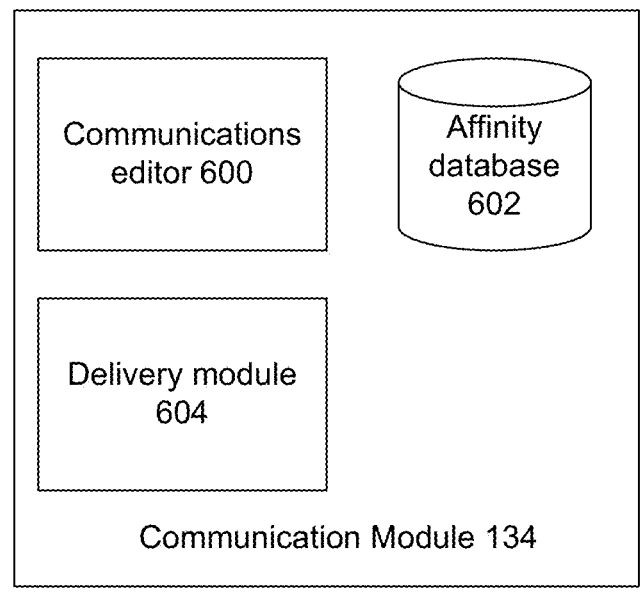
FIG. 6 is a block diagram of an example communications module.

Referring to FIG. 6, the preparation of communications and the delivery of communications to recipients are coordinated by the communication module 134. A communications editor 600 may assemble a draft communication including some or all of the content selected by the analytics module 131. The draft communication is provided to the sender for review, editing, and approval through the sender interface 400. The communications editor 600 may also assemble the content selected by the analytics module 131 into a format (e.g., a summary presentation, a spreadsheet, or a series of documents) to be presented to the sender through the sender interface 400. The sender may then prepare the communication. A recipient affinity database 602 stores recipient affinity information, such as preferences and interests of the recipients. In some examples, the recipient affinity information may be used to guide the communications editor in the assembly of the communication.

In instances where the sender is incapacitated, the communications editor 600, with the aid of the analytics module 131, can serve as a surrogate in composing communications automatically. For example, the sender may be seriously ill or even dead at the time of delivery (e.g., the sender may be an incapacitated or dead grandparent of the recipient). If the sender user is incapacitated or dead, the communications editor 600 may carry out previous instructions of the sender and request confirmation as appropriate from a designated proxy of the sender, such as a parent of the recipient or an executor of the sender's estate. In some cases, the communications editor 600 may requests confirmation of the identity, or role, or both, of the designated proxy. For instance, if the executor of the sender's estate logs into the proximity messaging social network using the deceased sender's credentials, the executor may be considered to have been authenticated as the sender's proxy.

In some examples, the communications editor 600 may review or edit a communication that was generated in the past to confirm that the communication is still valid, appropriate, or relevant, or a combination of any two or more of them. For instance, if a grandmother had previously prepared a communication with the message "Have a coffee on me at the Happy Coffee Shop" and including a coupon to the Happy Coffee Shop, the communications editor 600 may review the communication to determine whether the grandmother is still alive, whether the grandson drinks coffee, and whether the Happy Coffee Shop is still in business. For example, if the communications editor 600 determines that the grandson's religion denies him caffeine but that his favorite beverage is blueberry tea, and further determines that the Happy Coffee Shop has been purchased by a larger corporation, the communications editor may inform the grandmother of these changes, may automatically edit the communication to reflect these changes, or both.

A delivery submodule 604 coordinates the delivery of a communication to a recipient. The delivery submodule 604 receives notification from the location module 136 (described below) when the recipient is at or near a triggering location. The delivery submodule 604 then accesses the triggering database to retrieve the triggering time, if any, associated with the recipient and the triggering location. If the triggering time is satisfied, the delivery submodule 604 causes the communication to be sent to the recipient's computing device. In some examples, the delivery submodule 604 may alert the sender that the communication has been sent or may ask the sender for authorization to send the communication. If a physical item is to be sent to the recipient, the delivery submodule 604 sends a message to the recipient to schedule delivery of the physical item using a vendor 144, for example by a common carrier such as FEDEX, UPS, DHL, or the USPS, or to provide instructions for the recipient to retrieve the physical item.

The communication may be sent to the recipient by voice, email, by text message, or by an alert in an application specific to the communication system. In some examples, the communication itself is sent, e.g., in the body of an email. In some examples, a link to the communication is sent and the recipient clicks on or otherwise follows the link to access the communication.

Figure 7:
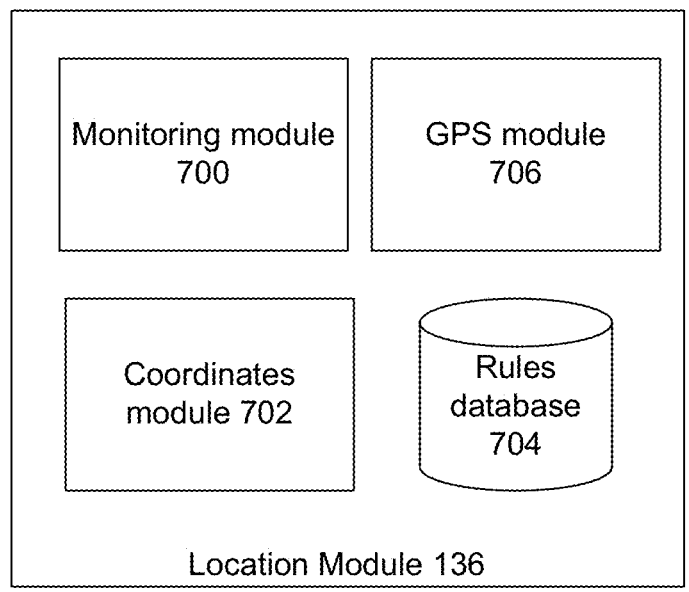
FIG. 7 is a block diagram of an example location module.

Referring to FIG. 7, for each recipient, the location module 136 determines when the recipient arrives at or near one of the associated triggering locations. A monitoring submodule 700 accesses the triggering database 132 (FIG. 1) to determine which recipients are to be monitored and to retrieve the triggering location associated with each recipient. In some examples, the triggering time for each recipient is used by the monitoring submodule 700 to determine whether the recipient's location is to be monitored. For instance, if the triggering time for a particular recipient is far in the future, the monitoring submodule 700 may not monitor the location of that recipient.

A coordinates submodule 702 in the location module 136 determines GPS coordinates for each triggering location by accessing maps and data sources. For instance, if the triggering location is "Royal Theater, Boston, Mass.," the location submodule 136 determines the GPS coordinates for that location by determining the address of the theater (e.g., by accessing a website for the theater) and then identifying the GPS coordinates for that address. In some examples, the coordinates submodule 702 may perform analytics to determine GPS coordinates. For instance, if the triggering location is "the ice cream shop by the recipient's house," the coordinates submodule 702 determines the address of the recipient's house, (e.g., by accessing the recipient database 124 (FIG. 1)), identifies the ice cream shop nearest that address (e.g., by accessing maps or websites), and then identifies the GPS coordinates for the address of the ice cream shop.

A GPS submodule 706 in the location module 136 monitors the location of the computing device associated with each recipient who is scheduled to receive a communication, e.g., by monitoring the GPS coordinates of the computing device. When the GPS submodule 706 determines that the GPS coordinates of a recipient's computing device are sufficiently close to the GPS coordinates of a triggering location for that recipient, the GPS submodule alerts the communication module 134 (FIG. 1). In some examples, a database 704 of proximity rules and algorithms is used to determine when the recipient is to be considered sufficiently close to the GPS coordinates of the triggering location.

Figure 8:
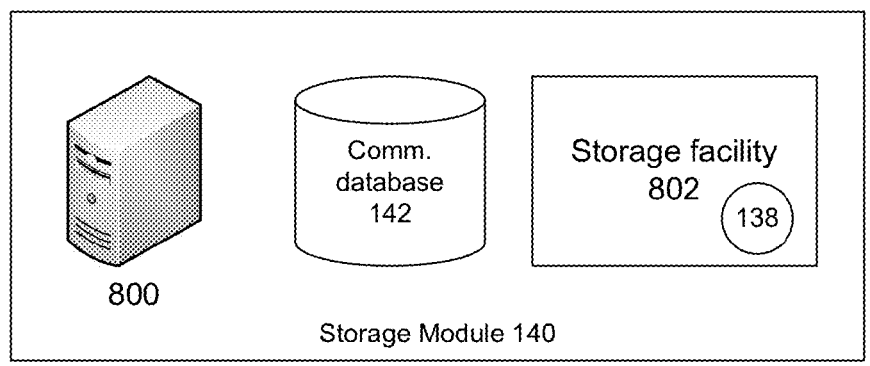
FIG. 8 is a block diagram of an example storage module.

Referring to FIG. 8, an example storage module 140 includes a communication database 142 hosted on a storage server 800 connected to the network 110. Communications, such as a communication generated by a sender, a communication generated automatically by the system, or both, can be stored in the communication database 142. When the communication system determines a particular recipient is at a triggering location, the communication associated with that recipient is retrieved from the communication database 142 and transferred over the network 110 to the communication system, from where the communication is sent to the recipient. The communication database 142 may also store multimedia content about or potentially of interest to the sender, the recipient, or both. This multimedia content may be used by the system to generate a communication or may be provided to the sender to assist in the generation of a communication. Examples of multimedia content include, e.g., digitized speech, digitized music, digital text documents, digital photographs or videos, scanned documents or photographs, screenshots of websites, and other content. The storage module 140 may also include a facility 802, such as a warehouse, for the storage of physical items 138 such as, e.g., photographs, mementoes, heirlooms, souvenirs, and other physical items. The storage server 800 stores information related to the physical items 138 stored in the facility 802, such as inventory, status, location in the warehouse, scheduled delivery dates, and other information.

The communication system described here can be used to send a location-based communication from a sender to a recipient in a wide variety of situations. Some examples uses of the communication system are described below.

Figure 9:
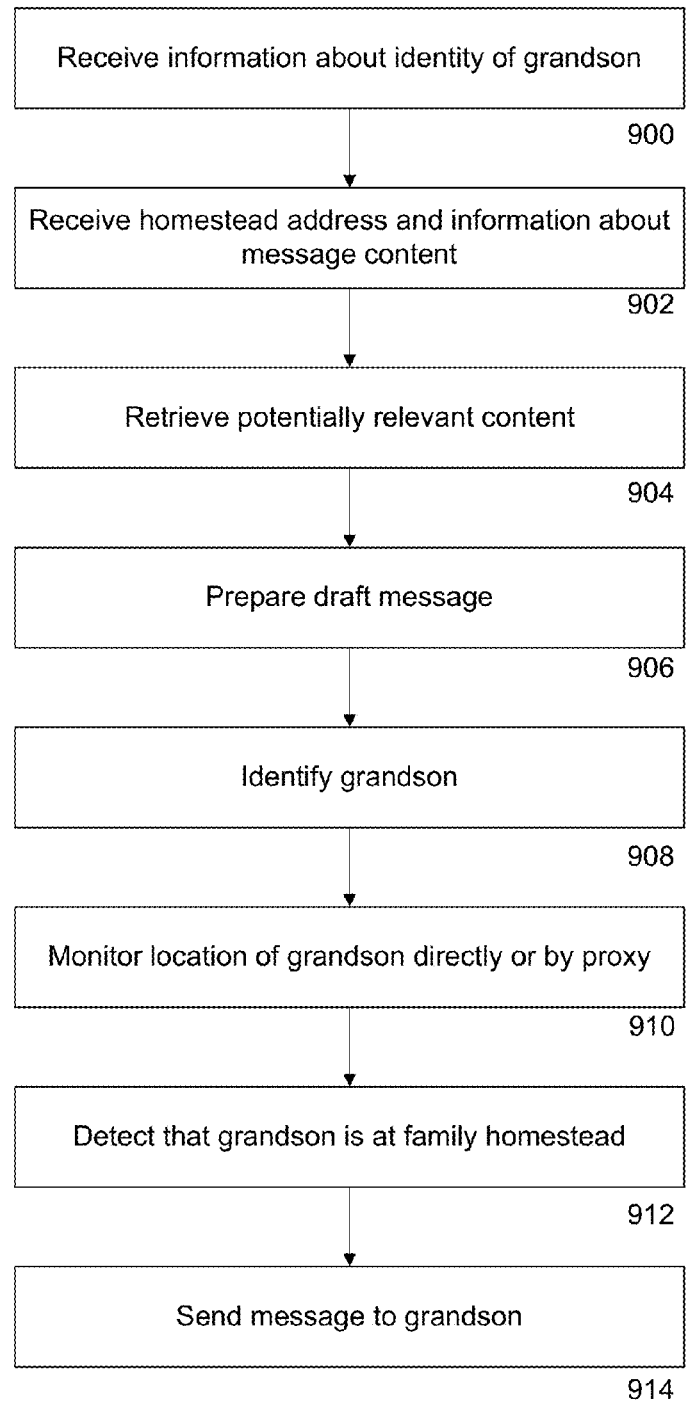
FIGS. 9-12 are flow charts.

Referring to FIG. 9, in a first example, a grandmother wants to send her unborn first grandchild a message when the grandchild first visits the family homestead. The grandmother provides information to allow the communication system to later determine the identity of the unborn first grandchild (900). The grandmother also specifies the address of the family homestead (the triggering location) and indicates that the message is to be composed of photographs of and news clippings about the grandmother and grandfather (902). The communication system identifies the grandfather and retrieves potentially relevant photographs and news clippings. e.g., from social networking sites and newspaper and magazine websites (904). The photographs and news clippings are formatted into a draft message which is sent to the grandmother for editing and approval (906). Later, the communication system determines the identity of the grandmother's unborn first grandchild (908), e.g., from a birth announcement in a local newspaper, from a social networking post by the grandchild's parents, or from the grandchild's own enrollment in the communication system or an affiliated social networking site. The communication system monitors the location of the grandchild's computing device, one or more of the grandchild's parents' computing devices, or another proxy for the grandchild's location (910). When the communication system detects that the grandchild is at the family homestead (912), the message is sent to the computing device that is at that location (914).

Figure 10:
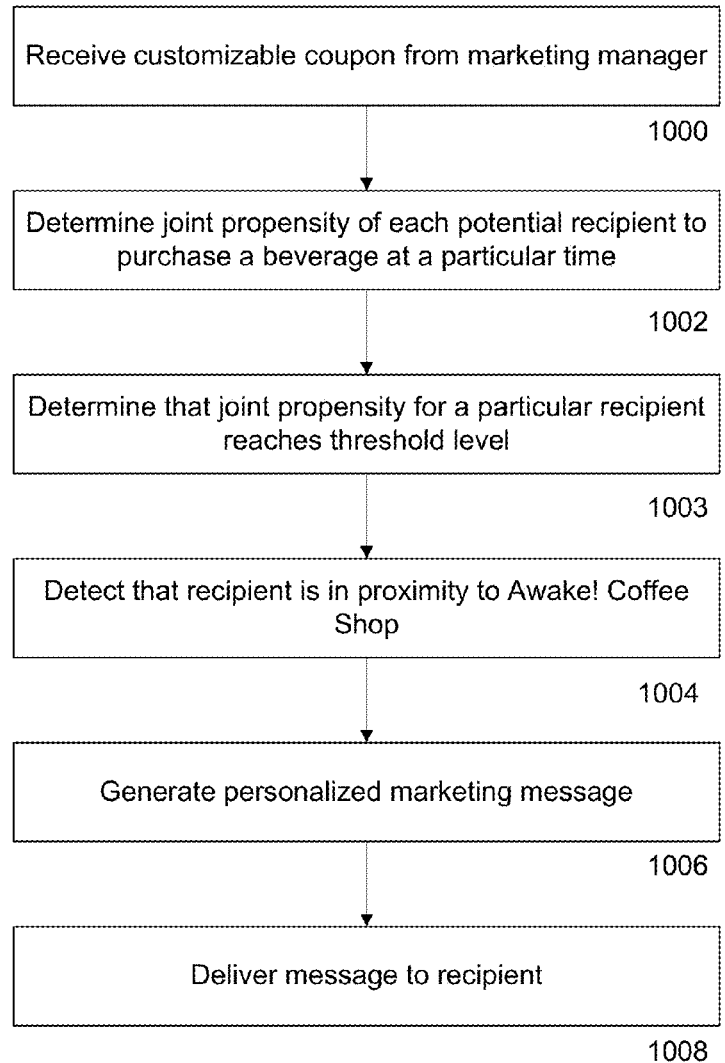

Referring to FIG. 10, in a second example, the Awake! Coffee Shop wants to send a coupon for use at the coffee shop to every registered recipient who passes within two miles of the coffee shop during the morning rush hour and who is a qualified prospect for purchases. The registered recipients may be people who were already registered with the communication system, e.g., by virtue of their enrollment in a social network site. The registered recipients may also be people who registered with the communication system in response to a promotion by the Awake! Coffee Shop, by the communication system itself or by another entity. For instance, the Awake! Coffee Shop may have notified its customers that those customers who register with the communication system would be eligible to receive coupons. In one example, social network users who "like" the Awake! Coffee Shop are automatically registered with the communication system. The communication system uses historical data regarding past purchases of potential recipients obtained from profiles of those potential recipients collected by the communication module 134 to enable the predictive analytics submodule 504 to determine the joint propensity of each potential recipient to purchase a particular type of beverage at a particular time of day (1002). When that joint propensity for a particular recipient reaches a predetermined threshold level (1003) and that recipient is in proximity to the Awake! Coffee Shop (1004), a personalized marketing message is automatically generated (1006) and delivered to a mobile device of the recipient (1008). For example, during the triggering time (i.e., during the morning rush hour), the communication system monitors the location of each registered recipient and sends a coupon to each recipient whose joint propensity reaches the threshold level and who passes within two miles of the coffee shop. In this example, there may be a vast number of potential recipients whose location the communication system may monitor (e.g. every registered recipient in the communication system or every registered recipient who has purchased coffee in the last year). The communication system may selectively monitor some potential recipients less frequently than others, or even not at all, to improve system performance. For instance, the communication system may monitor only registered recipients whose regular commute takes them past the Awake! Coffee Shop and whose joint propensity reaches the threshold level.

Figure 11:
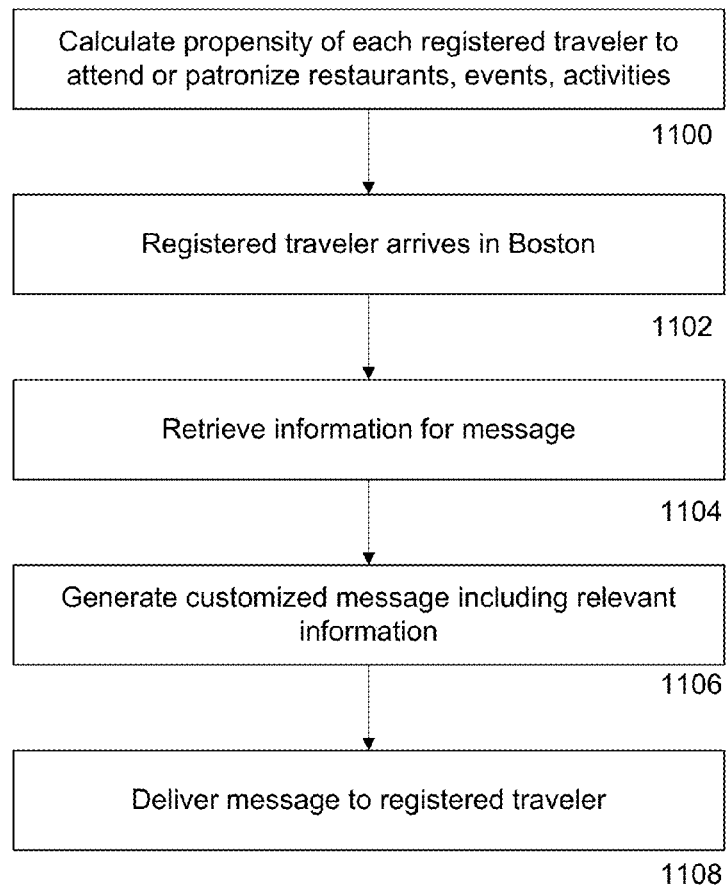

Referring to FIG. 11, in a third example, the Boston Tourism Board prepares a welcome message to be sent to each traveler who is registered with the communication system upon the traveler's arrival at Boston's Logan International Airport. A traveler may register with the communication system, e.g., by "liking" a Boston-related entity on a social networking site, by purchasing a plane ticket to Boston, by reserving a hotel room in Boston, or by another action. Based on each registered traveler's profile and other historical data including, e.g., past purchases and attendance at events or restaurants, the predictive analytics submodule 504 calculates the propensity of each registered traveler to attend or patronize various restaurants, events, and other activities (1100). When a registered traveler arrives in Boston (1102), the communication system retrieves information such as maps, restaurant listings, and event schedules from publicly available websites and other sources of information (1104) and automatically generates a customized message including information determined to be most relevant to the traveler based on the calculated propensity of that traveler (1106). The customized message is delivered to the traveler (1108).

In a fourth example, a human resources department of a corporation registers each employee of the corporation with the communication system. In some cases, the communication system may act as a surrogate for a corporate sender and use the corporate personnel database to identify recipients and, based on the profiles of the recipients, determine appropriate parameters and/or communications. The communication system may be used for location-based communication with the employees. In one example, a worksite in Atlanta, Ga., is in need of additional employees for a short-term project. The communication system may be used to send a message to all qualified employees who are within a certain distance (e.g., 100 miles) of the worksite alerting them to the project opportunity. In one example, an employee traveling to India requests that additional parts be sent to him for use in completing a repair. The communication system determines the location of the employee (e.g., the address of his hotel, the address of his worksite, or another location) and arranges for the additional parts to be sent directly to the employee. In one example, the corporation may offer a discounted health club membership to its employees. The communication system may be used to send a reminder message to any employee who passes within one mile of the health club.

Figure 12:
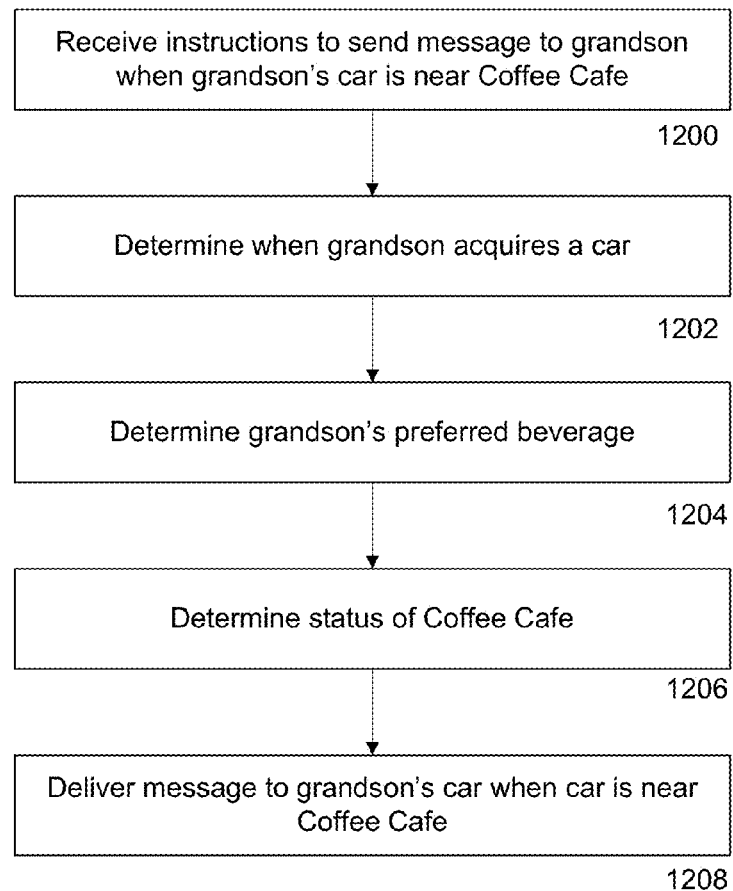

Referring to FIG. 12, in a fifth example, a mobile navigation device, such as a GPS device or mobile computing device installed in a car, may be linked to the communication system via the internet, a mobile communications network, or both. A sender can instruct the communication system to send a message to a recipient based on the location of the recipient's mobile navigation device. The message can be sent to the recipient's computing device (e.g., a smartphone), to the recipient's mobile navigation device, or both. For instance, a grandmother may instruct the communication system to send a message to her as-yet-unborn grandson if his car ever passes by the Coffee Café in New York City, as determined by the grandson's mobile navigation device (1200). The predictive analytics submodule 504, using electronically-accessible sources, determines when the grandson acquires a car or other vehicle with a registered mobile navigation device (1202), the grandson's preferred caffeinated beverage if any (1204), and whether the Coffee Café still exists or has merged with another company (1206). If the grandmother's message is still relevant, the communication system delivers it to the car's mobile device when it passes a Coffee Café in New York City (1208). In case the grandmother is dead or incapacitated the communication system as her surrogate (described above) composes a relevant message and delivers it to the vehicle's mobile device. The message may include images, voice recordings, videos, icons to be clicked on, or other media, or a combination of any two or more of them. For instance, the message may include an icon that, when clicked, leads to a Quick Response (QR) code for a coupon to the Coffee Café.

The grandson can scan the QR code with his smartphone and then bring the smartphone into the Coffee Café to redeem the coupon.

As desired, the system may include more or fewer than the components illustrated.

The system is described above with reference to block and flow diagrams of systems, methods, apparatuses, and/or computer program products according to examples. In some instances, the publisher and reader users may access the system by desktop or laptop computers. In some embodiments, the publisher and reader users may access the system by mobile devices such as smart phones. In some embodiments, the publisher and reader users may access the system by tablet computers or any commercial computing device connected to the internet. In some cases, the system may be constructed to operate on the internet independent of existing systems. The significant event system may operate using existing social networks, e.g., Facebook®), Google+®, or Yammer™ as platforms using existing application interfaces open to website developers.

One or more blocks of the block diagrams and flow diagrams, and combinations of blocks in the block diagrams and flow diagrams, respectively, can be implemented by computer-executable program instructions. Some blocks of the block diagrams and flow diagrams may not necessarily need to be performed in the order presented, or may not necessarily need to be performed at all, in some cases.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the system has been described in connection with certain examples, is the system is not limited to the disclosed embodiments, but on the contrary, includes various modifications and equivalent arrangements. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g. an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or communication data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component. e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Other implementations are also within the scope of the following claims.

What is claimed is:

1. A computer-implemented method comprising:
receiving, from or on behalf of a sender, (a) location criteria indicative of two or more possible locations, and (b) information indicative of content for a communication to be sent from or on behalf of the sender to a recipient who is related to the sender by blood or employment;
inferring one of the possible locations as an expected future location of the recipient based on a relationship between the location criteria and content of publicly available electronically-accessible resources by or about the sender, the recipient, or both;
inferring content for the communication based on a relationship between the received information indicative of the content and content of publicly available electronically-accessible resources;
scheduling delivery of the communication to the recipient based on the inferred expected future location of the recipient;
detecting an actual location of the recipient, wherein detecting an actual location of the recipient includes detecting GPS coordinates of a computing device associated with the recipient; and
sending the communication to the recipient when the actual location of the recipient matches the inferred location.

2. The method of claim 1, comprising sending the communication to the recipient when the recipient is at or near the expected future location.

3. The method of claim 1, comprising sending the communication to a mobile computing device associated with the recipient.

4. The method of claim 1, wherein scheduling delivery includes scheduling delivery of the communication to the recipient at a specified future time.

5. The method of claim 4, comprising sending the communication to the recipient when the recipient is at or near the inferred future location at the specified future time.

6. The method of claim 4, comprising:
receiving time criteria for determining the specified future time; and
determining the future time based on the time criteria.

7. The method of claim 1, wherein the location criteria include at least one of a characteristic of the expected future location, a characteristic of the sender, and a characteristic of the recipient.

8. The method of claim 1, comprising generating the communication, wherein generating the communication comprises:
generating, for review by the sender, a draft communication including at least some of the inferred content;
providing the draft communication to the sender; and
receiving the communication from the sender.

9. The method of claim 8, wherein generating the communication includes generating the communication including at least some of the inferred content.

10. The method of claim 1, wherein inferring one of the possible locations as an expected future location comprises conducting an automated analysis of the electronically-accessible resources to infer the expected future location.

11. The method of claim 1, wherein the communication includes a multimedia message.

12. The method of claim 1, wherein the electronically-accessible resources include at least one of (a) electronically-accessible or mobile social networking facilities, (b) electronically-accessible or mobile periodicals, and (c) websites.

13. The method of claim 1, wherein the electronically-accessible resources include a database storing data relevant to the sender, the recipient, or both.

14. A computer-implemented method comprising:
receiving, from or on behalf of a sender, (a) recipient criteria from which an identity of a recipient can be inferred, (b) time criteria from which a future time at which a communication is to be sent from the sender to the recipient can be inferred, (c) location criteria indicative of two or more possible locations and (d) information indicative of content for the communication;
inferring (1) the identity of the recipient based on a relationship between the recipient criteria and content of publicly available electronically-accessible resources by or about the sender, the recipient, or both, (2) the future time based on a relationship between the time criteria and content of publicly available electronically-accessible resources, and (3) one of the possible locations as an expected future location of the recipient based on a relationship between the location criteria and content of publicly available electronically-accessible resources;
inferring content for the communication based on a relationship between the received information indicative of the content and content of publicly available electronically-accessible resources;
scheduling delivery of the communication to the recipient at the inferred future time based on the inferred expected future location of the recipient;
detecting an actual location of the recipient, wherein detecting an actual location of the recipient includes detecting GPS coordinates of a computing device associated with the recipient; and sending the communication to the recipient when the actual location of the recipient matches the inferred location.

15. The method of claim 14, comprising sending the communication to the recipient when the recipient is at or near the inferred expected future location at the inferred future time.

16. The method of claim 14, comprising sending the communication to a mobile computing device associated with the recipient.

17. The method of claim 14, wherein the location criteria include at least one of a characteristic of the expected future location, a characteristic of the sender, and a characteristic of the recipient.

18. The method of claim 14, wherein the recipient criteria include a relationship between the sender and the recipient.

19. The method of claim 18, wherein the recipient criteria include a future relationship between the sender and the recipient.

20. The method of claim 14, wherein the recipient criteria include a characteristic of the recipient.

21. The method of claim 14, comprising generating the communication, wherein generating the communication comprises:
   generating a draft communication including at least some of the inferred content;
   providing the draft communication to the sender; and
   receiving the communication from the sender.

22. The method of claim 14, wherein generating the communication includes generating the communication including at least some of the inferred content.

23. The method of claim 14, wherein inferring one of the possible locations as an expected future location comprises conducting an automated analysis of the electronically-accessible resources to infer the expected future location.

24. The method of claim 14, wherein the communication includes a multimedia message.

25. The method of claim 14, wherein the electronically-accessible resources include at least one of (a) electronically-accessible or mobile social networking facilities, (b) electronically-accessible or mobile periodicals, and (c) websites.

26. The method of claim 14, wherein the electronically-accessible resources include a database storing data relevant to the sender, the recipient, or both.

27. A computer-implemented method comprising:
   receiving, from or on behalf of an employer, (a) location criteria indicative of two or more possible locations and (b) information indicative of content for a communication to be sent from or on behalf of the employer to an employee;
   inferring one of the possible locations as an expected future location of the employee based on a relationship between the location criteria and content of publicly available electronically-accessible resources by or about the employee;
   inferring content for the communication based on a relationship between the received information indicative of the content and content of publicly available electronically-accessible resources;
   scheduling delivery of the communication to the employee based on the inferred expected future location of the employee;
   detecting an actual location of the employee, wherein detecting an actual location of the employee includes detecting GPS coordinates of a computing device associated with the employee; and
   sending the communication to the employee when the actual location of the recipient matches the inferred location.

28. The method of claim 27, comprising sending the communication to the employee when the employee is at or near the inferred expected future location.

29. The method of claim 27, comprising sending the communication to a mobile computing device associated with the employee.

30. The method of claim 27, scheduling delivery includes scheduling delivery of the communication to the employee at a specified future time.

31. The method of claim 27, comprising sending the communication to the employee when the employee is at or near the inferred expected future location at the specified future time.

32. The method of claim 27, comprising:
   receiving time criteria for determining the specified future time; and
   determining the future time based on the time criteria.

33. The method of claim 27, wherein the location criteria include at least one of a characteristic of the expected future location, a characteristic of the employer, and a characteristic of the employee.

34. The method of claim 27, comprising generating the communication, wherein generating the communication comprises:
   generating a draft communication including at least some of the inferred content;
   providing the draft communication to the employer or an agent for the employer; and
   receiving the communication from the employer or the agent for the employer.

35. The method of claim 27, generating the communication includes generating the communication including at least some of the inferred content.

36. The method of claim 27, wherein inferring one of the possible locations as an expected future location comprises conducting an automated analysis of the electronically-accessible resources to infer the expected future location.

37. The method of claim 27, wherein the electronically-accessible resources include at least one of (a) electronically-accessible or mobile social networking facilities, (b) electronically-accessible or mobile periodicals, and (c) websites.

38. The method of claim 27, wherein the electronically-accessible resources include a database storing data relevant to the employer, the employee, or both.

39. A computer-implemented method comprising:
   receiving, from or on behalf of a sender, location criteria from which a then unknown identity of a future location of a recipient who is related to the sender by blood or employment can be inferred;
   inferring the identity of the future location based on a relationship between the location criteria and a result of an automated analysis of publicly available electronically-accessible resources by or about the sender, the recipient, or both;
   scheduling delivery of the communication to the recipient based on the inferred future location of the recipient;
   detecting an actual location of the recipient, wherein detecting an actual location of the recipient includes detecting GPS coordinates of a computing device associated with the recipient; and
   sending the communication to the recipient when the actual location of the recipient matches the inferred location.

* * * * *